J. H. SHREINER.
Grain and Seed Drills.
No. 141,730. Patented August 12, 1873.
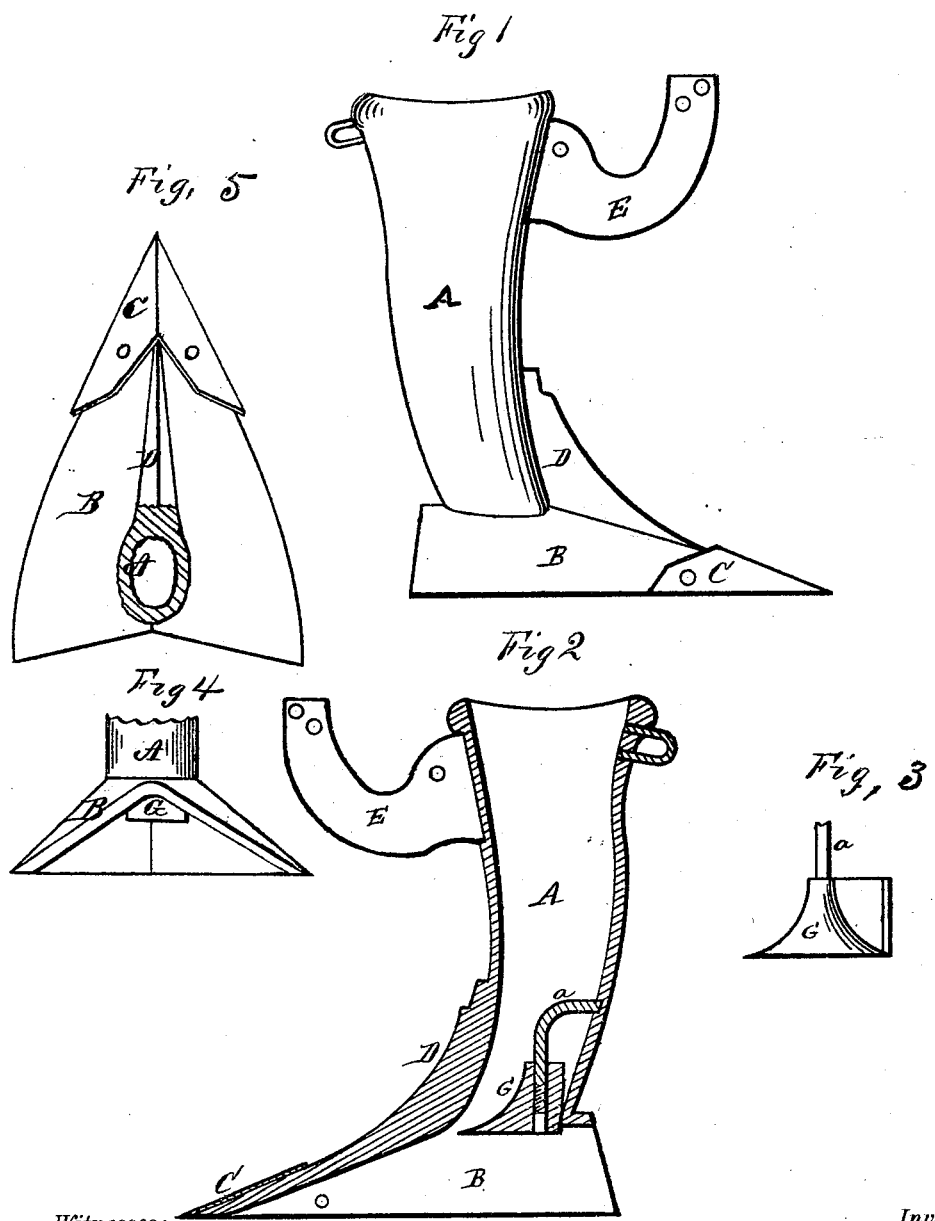

UNITED STATES PATENT OFFICE.

JACOB H. SHREINER, OF WILMINGTON, DELAWARE.

IMPROVEMENT IN GRAIN AND SEED DRILLS.

Specification forming part of Letters Patent No. 141,730, dated August 12, 1873; application filed June 6, 1873.

*To all whom it may concern:*

Be it known that I, JACOB H. SHREINER, of Wilmington, in the county of New Castle and in the State of Delaware, have invented certain new and useful Improvements in Grain and Seed Drills; and do hereby declare that the following is a full, clear, and exact description thereof, reference being had to the accompanying drawings and to the letters of reference marked thereon, making a part of this specification.

The nature of my invention consists in a triangular-shaped shovel, with a curved cutter on its upper surface, cast in one piece with the ordinary boot or point shovel now in common use. My invention also consists in the means for suspending and adjusting the bell-shaped distributer within the boot, said seed-distributer having been patented by me August 25, 1868.

In order to enable others skilled in the art to which my invention appertains to make and use the same, I will now proceed to describe its construction and operation, referring to the annexed drawing, in which—

Figure 1 is a side view of the boot with my improved shovel and cutter. Fig. 2 is a longitudinal vertical section of the same, showing also the means for suspending the bell-shaped seed-distributer. Fig. 3 shows the seed-distributer, and Figs. 4 and 5 show the triangular-shaped shovel.

A represents the ordinary boot or feed-pipe, constructed in any of the known and usual ways. B represents the triangular-shaped shovel, having a share, C, fastened on it by rivets or bolts, thus protecting the point of the shovel. D is a curved cutter, conforming to the shape of the boot A, and forms a part of the shovel B. The shovel B and cutter D are cast in one piece with the boot A.

The triangular-shaped shovel B makes a wide furrow in the ground, so that the seed may be equally distributed in the ground underneath the shovel by the bell-shaped seed-distributer G. The cutter D is given a sufficient curvature and sharp edge for the purpose of dividing the ground and allowing it to pass freely over the shovel B, covering the grain immediately and in a uniform depth, giving every grain sufficient room in the ground to germinate and grow.

The inside of the lower end of the boot A is contracted, as shown in Fig. 2; and in this contracted part is located the bell-shaped seed-distributer G, which is screwed onto the end of a curved screw-rod, $a$, which is cast in the boot A. By this means the seed-distributer G may be adjusted up or down, as required. E represents a slotted projection on the upper end of the boot A, for the purpose of suspending the shovels in gang to form a broadcast grain-drilling machine. This projection E is provided with holes, for the purpose of regulating the shovel.

Having thus fully described my invention, what I claim as new, and desire to secure by Letters Patent, is—

1. The triangular-shaped shovel B and cutter D, cast in one piece with the boot A, substantially for the purposes herein set forth.

2. The curved screw-rod $a$, cast in the boot A, and having the bell-shaped seed-distributer G adjustably fixed to its lower end, substantially as herein set forth.

In testimony that I claim the foregoing I have hereunto set my hand this 5th day of June, 1873.

JACOB H. SHREINER.

Witnesses:
C. L. EVERT,
EDMUND B. FRAZER.